United States Patent [19]

Williams

[11] Patent Number: 4,970,517
[45] Date of Patent: Nov. 13, 1990

[54] MICROWAVE SENSING

[75] Inventor: Heyward S. Williams, Derry, N.H.

[73] Assignee: Alpha Industries, Inc., Woburn, Mass.

[21] Appl. No.: 454,034

[22] Filed: Dec. 28, 1982

[51] Int. Cl.[5] .......................... G01S 13/56; G08B 13/24
[52] U.S. Cl. ......................................... 342/28; 340/552
[58] Field of Search ................. 343/5 DD, 5 PD, 7.7; 340/513, 522, 552, 554; 367/93, 94; 342/27, 28, 202

[56] References Cited

U.S. PATENT DOCUMENTS

| | | | |
|---|---|---|---|
| 3,182,312 | 5/1965 | Daniels | 343/5 TM X |
| 3,932,871 | 1/1976 | Foote | 343/5 PD |
| 4,027,303 | 5/1977 | Neuwirth et al. | 343/5 DD |
| 4,079,375 | 3/1978 | Tacussel | 342/28 |
| 4,090,195 | 5/1978 | Gennou et al. | 342/28 |
| 4,112,421 | 9/1978 | Freeny, Jr. | 343/457 |
| 4,117,464 | 9/1978 | Lutz | 342/28 |
| 4,215,341 | 7/1980 | Cole | 342/28 X |
| 4,295,131 | 10/1981 | Bonori et al. | 342/28 X |
| 4,310,842 | 1/1982 | Siebeneck et al. | 343/5 PD |
| 4,322,722 | 3/1982 | Kozdon | 343/5 PD |
| 4,358,759 | 11/1982 | Stewart et al. | 343/5 DD X |

FOREIGN PATENT DOCUMENTS 1086400 9/1980 Canada.

OTHER PUBLICATIONS

W. Shilz, "Novel Microwave Technique for Industrial Measurements", Conf. Proc. of the 8th European Microwave Conf., Paris, France, (4–8 Sep. 1978), pp. 166–175.
M. W. Hosking, "Microwave Intruder Alarm-2", Wireless World Avg. 77, vol. 83, No. 1500, pp. 37–40.
Lazarus et al., "Fresnel-Zone Plate Aids Low-Cost Doppler Design", Microwaves, vol. 18, No. 11, Nov. (1979).

Primary Examiner—Gilberto Barrón, Jr.
Attorney, Agent, or Firm—Fish & Richardson

[57] ABSTRACT

A microwave horn having a narrow radiation beam characteristic is energized by a Gunn oscillator coupled to a driver/detector that turns the Gunn oscillator on for a small fraction of a period to produce a sequence of detected pulses representative of an item being sensed that is amplified by an A.C. amplifier and filtered with gain controlled by a sensitivity potentiometer that energizes a threshold detector to produce threshold pulses that trigger hold-off circuitry to produce an output pulse when the threshold pulse is outside the duration of the output pulse. A hold-off potentiometer controls the duration of each output pulse. An output driver amplifies the output pulse and delivers it to an output terminal.

13 Claims, 3 Drawing Sheets

MICROWAVE SENSING

The present invention relates in general to microwave sensing and, more particularly, concerns novel apparatus and techniques for reliably counting or sensing objects. The apparatus is compact, requires very little input power, and is relatively easy to install and adjust.

There are numerous microwave sensing systems. It is an important object of this invention to provide an improved microwave sensing system which is readily and easily included as a component in control systems. To accomplish this goal, the invention senses a wide range of objects and is operable in an industrial environment.

BRIEF SUMMARY OF THE INVENTION

According to the invention, there is circuitry to regulate and condition the input power, microwave transceiving means for transmitting microwave energy and receiving a portion of the transmitted energy reflected from an object to be sensed, amplifying and detecting means for providing a signal representative of an object to be sensed, and hold-off circuitry means for providing an output signal during a predetermined time interval after an object has been detected; the whole embodied in a compact, rugged unit requiring very little input power.

Numerous other features, objects and advantages of the invention will become apparent from the following specification when read in connection with the accompanying drawing in which:

DETAILED DESCRIPTION

Figure 1:
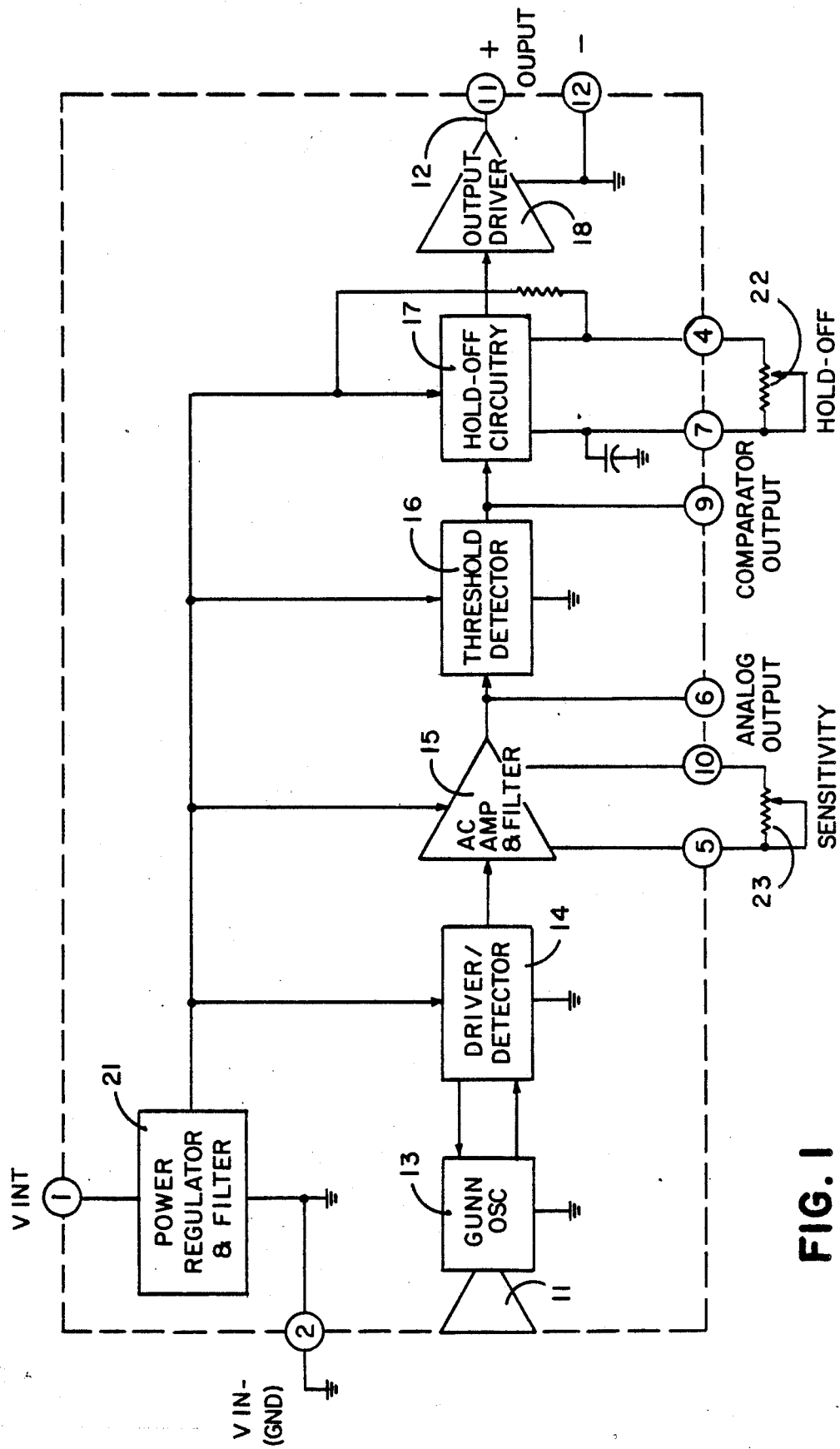
FIG. 1 is a block diagram illustrating the logical arrangement of a system module according to the invention.

With reference now to the drawing and more particularly FIG. 1 thereof, there is shown a block diagram illustrating the logical arrangement of a system according to the invention. A cavity controlled Gunn diode oscillator 13 is, cyclically pulsed on for 10 microseconds at a 100 Hz rate by the driver/detector circuitry 14 to provide microwave energy to the antenna 11 which illuminates an area where items or objects are to be sensed. The antenna 11 has a narrow radiation beam, typically within an angle of 22 degrees in one plane, usually horizontal, and 36 degrees in the perpendicular plane, usually vertical. Energy reflected from an object in this area captured by antenna 11 causes a change in the D.C. operating parameters of the Gunn oscillator. The driver/detector 14 samples the current drawn by the Gunn diode during each pulse, and any change in the reflected energy received by the oscillator (due, for example, to an object moving in or out of the beam of antenna 11) will, therefore, result in a change in the detected output. A.C. amplifier and filter 15 amplifies the detected signal by an amount determined by sensitivity control 23 which is accessible to the user. The threshold detector 16 provides an output pulse when the amplified signal exceeds a predetermined threshold. This threshold is adjusted automatically by the threshold circuitry to compensate for long-term changes in the Gunn oscillator due to environmental conditions. The output pulse of the threshold detector 16 then is lengthened by the re-triggerable hold-off delay circuitry 17 to eliminate multiple triggers from one object. This hold-off delay is controlled by adjustment 22 which is also accessible to the user. The output of the hold-off delay circuitry 17 is then amplified by output driver 12 to provide a signal at terminal 11 which is suitable for actuating a counter, control system or other devices. All the circuitry receives D.C. power from the power regulator and filter 21. The specific circuits are known in the art and are not a part of the invention. The invention is unique, however, in the application and interconnection of these circuits.

Figure 2A:
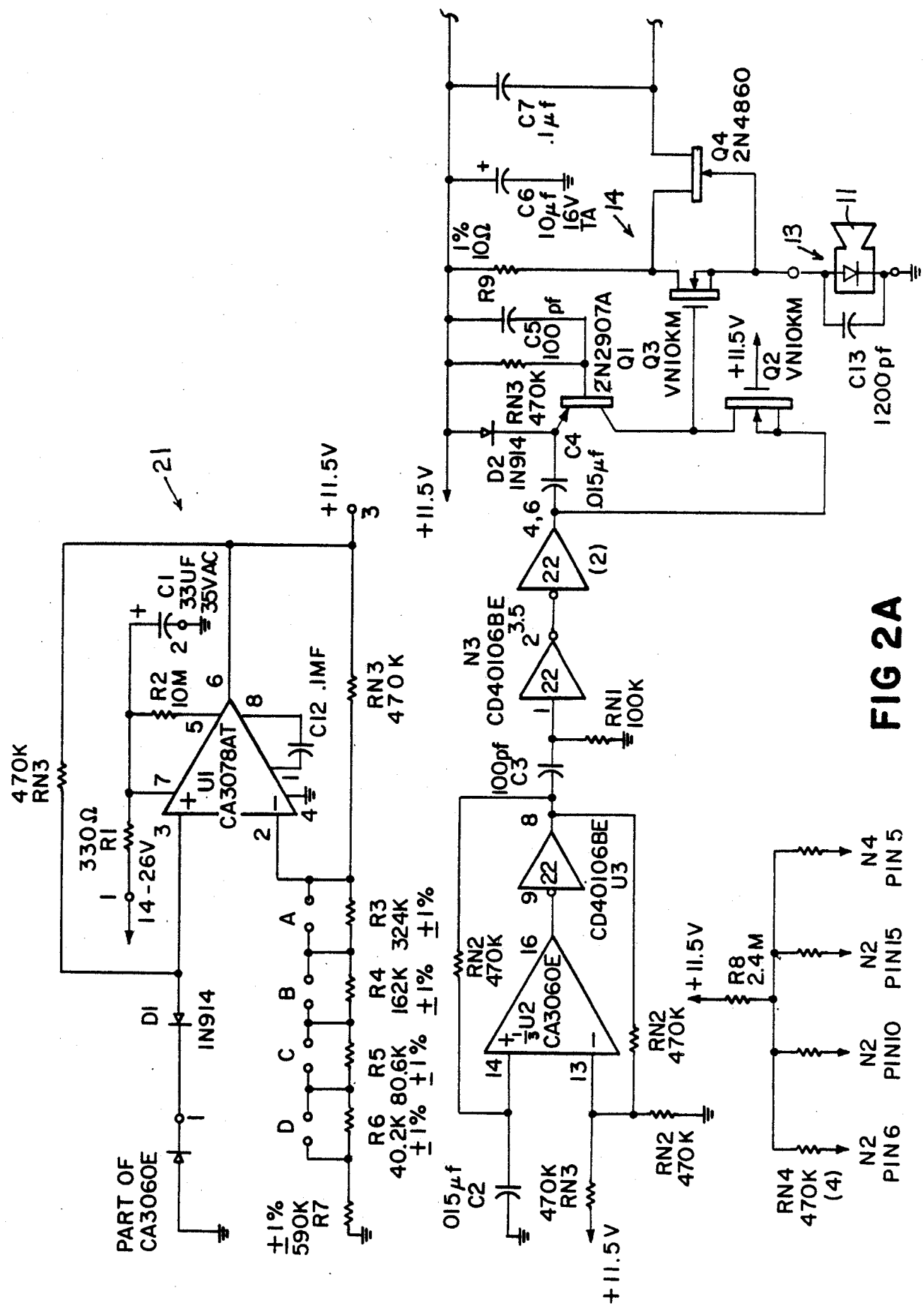
FIGS. 2A and 2B are a schematic circuit diagram of a preferred embodiment of the invention.
Figure 2B:
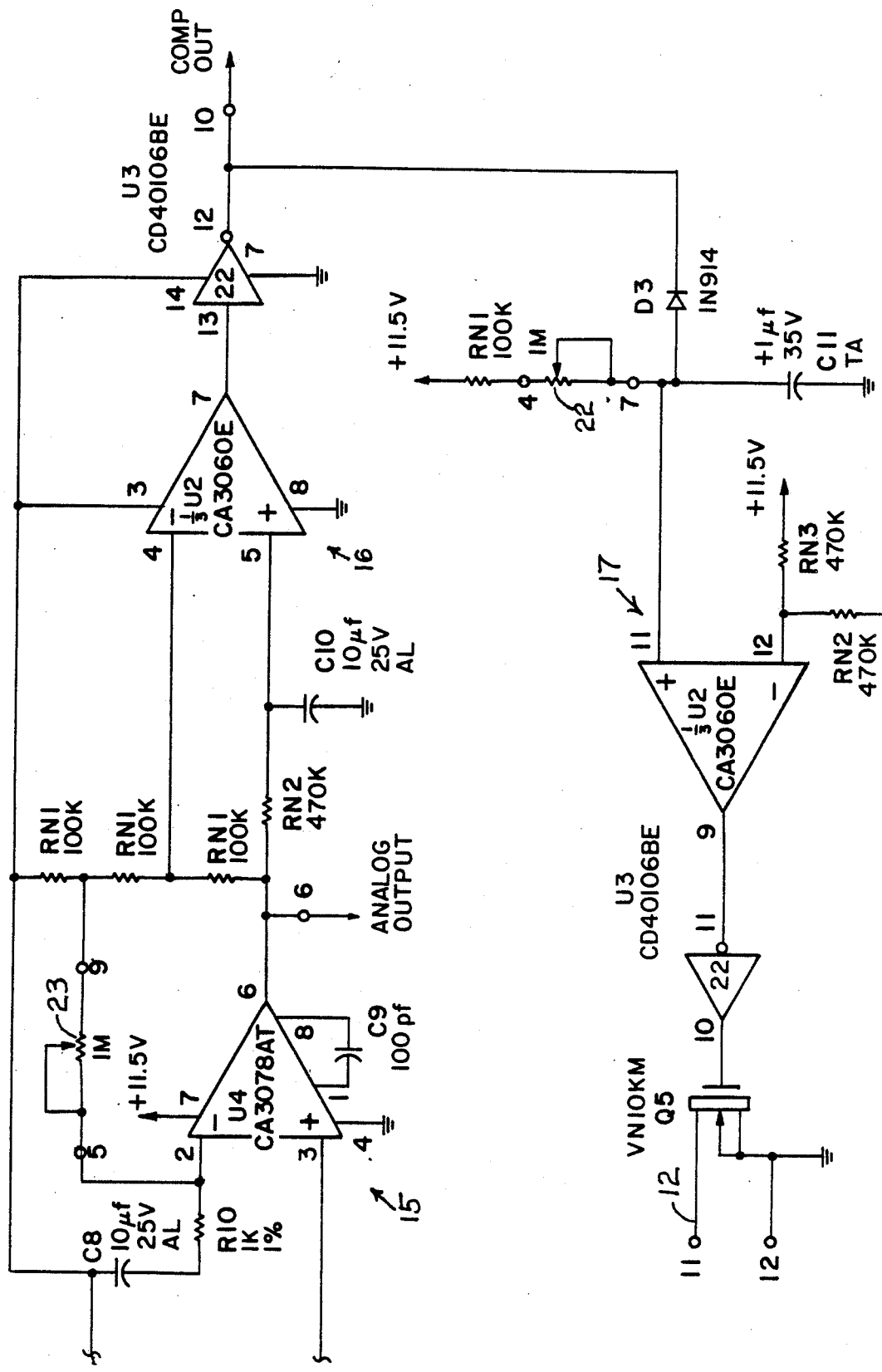

Referring to FIGS. 2A and 2B, there is shown a schematic circuit diagram of a preferred embodiment of the invention. This embodiment comprises integrated circuits U1–U4, transistors Q1–Q5 and associated circuit components. Since those skilled in the art will be able to build an actual working model of the invention with FIG. 2, FIG. 2 will only be briefly discussed. To the extend practical, circuit portions in FIG. 2 corresponding to blocks or other elements in FIG. 1 are identified by corresponding reference symbols.

The amplifier between pins 13, 14 and 16 of integrated circuit U2, the logical inverter between pins 8 and 9 of integrated circuit U3 and associated components comprise a square wave pulser that provides a 10 microsecond gating pulse every 10 milliseconds for enabling Gunn oscillator 13 and draws but 350 microamperes of current.

Resistor R9 comprises a current sensing resistor that develops a voltage indicative of the current drawn by power switch transistor Q3 when Gunn oscillator 13 is enabled to charge capacitor C7 through transistor Q4. Capacitor C7 functions as a sample and hold capacitor that provides a signal amplified by A.C. amplifier and filter 15 for delivery to threshold detector 16 to provide a signal for each item sensed through the logical inverter having terminals 7 and 12–14 of integrated circuit U3 that is delivered to hold-off circuitry 17 comprising a retriggerable monostable miltivibrator having an adjustable monostable duration controlled by the potentiometer connected to the anode of diode D3 to provide an output signal that is amplified by the output driver comprising transistor Q5.

The power regulator and filter 21 comprises integrated circuit U1 and associated components with the voltage divider network comprising resistor R3 and resistors providing D.C. potentials to the indicated pins of integrated circuits U2 and U4.

A feature of the invention resides in having the duty cycle significantly less than one percent, typically 0.1 percent. Pulsing occurs at an audio frequency, typically 100 Hz. A typical microwave frequency for Gunn oscillator 13 is 10.525 GHz.

The invention has a number of advantages. It senses both metallic and nonmetallic objects without actually touching the object. It can detect objects passing behind a screen or in a chute providing the screen or chute is nonmetallic. It is sufficiently sensitive to detect objects at a range as far as eight feet. The relatively narrow beam facilitates maintaining good resolution while having different beamwidths in orthogonal planes allows flexibility in optimizing the beamwidth for a given application. The invention is relatively unaffected by ambient contaminates, is relatively insensitive to noise, consumes very little power, operates over a wide temperature range, is of rugged construction and meets FCC regulations for RF emitting devices.

The invention may typically be used for parts counting, process control, container film monitoring, die ejection monitoring, obstruction warning systems, automatic door openers, intrusion alarms, limit switches or for counting vehicles or people.

The invention is designed to be incorporated into standard industrial enclosures with antenna 11 (which may be protected with an integral window) exposed to the environment. The unit may be designed to plug into standard circuit connectors.

There has been described novel apparatus and techniques for microwave sensing that uses a compact rugged reliable structure that may be readily incorporated into existing equipment for process control in the industrial environment. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Micowave sensing apparatus comprising,
    microwave transceiving means for radiating microwave energy and receiving energy reflected from items to be sensed to provide a signal indicating the presence of the sensed items,
    said microwave transceiving means including driver/detector means for cyclically enabling said transceiving means only during a predetermined initial portion of a cycle that is less than 1% of the duration of said cycle,
    means for monitoring said transceiving means during said initial portion of the cycle and providing a monitor signal representative of the result of said monitoring,
    means for amplifying said monitor signal,
    threshold detecting means for providing a threshold signal when the magnitude of the amplifier monitor signal exceeds a predetermined value,
    hold-off delay means for providing an output pulse in response to only those threshold signals that occur outside the duration of an output pulse provided by said hold-off means,
    and output signal conditioning means responsive to said output pulses for providing utilization signals useful in the industrial environment representative of items sensed by said apparatus,
    said microwave transceiving means comprising a cavity-controlled Gunn oscillator means for generating and receiving microwave energy operating at a predetermined microwave frequency and pulsed at a predetermined audio-frequency rate at a duty cycle significantly less than 1% and having a Gunn diode,
    and said means for monitoring including means for sampling the current drawn by said Gunn diode during each pulse,
    changes in the reflected energy received by said Gunn oscillator means resulting in a change in said current.

2. Microwave sensing apparatus in accordance with claim 1 and further comprising control means for adjusting the duration of the output pulse provided by said hold-off means.

3. Microwave sensing apparatus in accordance with claims 1 and further comprising control means for controlling the gain of said amplifying means to control the sensitivity of said apparatus.

4. Microwave sensing apparatus in accordance with claim 1 and further comprising control means for adjusting the gain of said amplifying means to control the sensitivity of said apparatus.

5. Microwave sensing apparatus in accordance with claim 1 wherein said duty cycle is of the order of 0.1 percent.

6. Microwave sensing apparatus in accordance with claim 1 wherein said predetermined audiofrequency is of the order of 100 Hz.

7. Microwave sensing apparatus in accordance with claim 1 wherein said predetermined microwave frequency is of the order of 10.525 GHz.

8. Microwave sensing apparatus in accordance with claim 1 and further comprising a power regulator and filter means for conditioning the input D.C. power.

9. Microwave sensing apparatus in accordance with claim 8 and further comprising control means for adjusting the gain of said amplifying means to control the sensitivity of said apparatus.

10. Microwave sensing apparatus in accordance with claim 1 wherein said microwave transceiving means comprises antenna means for radiating said microwave energy in a narrow radiation beam.

11. Microwave sensing apparatus in accordance with claim 10 wherein said antenna means is characterized by a narrow radiation beam within an angle of substantially 22° in a first plane and substantially 36° in a second plane orthogonal to said first plane.

12. Microwave sensing apparatus in accordance with claim 1 wherein
    said driver/detector means comprises a gated power transistor,
    said microwave transceiving means comprises a Gunn diode in series with said gated power transistor,
    and said means for monitoring includes a current sensing resistor in series with said gated power transistor providing a signal representative of the current drawn by said gated power transistor when said Gunn diode oscillator is enabled.

13. Microwave sensing apparatus in accordance with claim 12 and further comprising
    a holding capacitor and a charging resistor,
    and means for charging said holding capacitor through said charging resistor and current sensing resistor when said Gunn oscillator is enabled.

* * * * *